Oct. 25, 1955  O. H. SCHMITT  2,721,974
MAGNETOMETER

Filed Aug. 7, 1944  2 Sheets-Sheet 1

INVENTOR
OTTO H. SCHMITT
BY
ATTORNEYS

Oct. 25, 1955  O. H. SCHMITT  2,721,974
MAGNETOMETER
Filed Aug. 7, 1944  2 Sheets-Sheet 2

INVENTOR
OTTO H. SCHMITT
BY
R. J. Tompkins
ATTORNEYS

United States Patent Office 2,721,974
Patented Oct. 25, 1955

2,721,974

MAGNETOMETER

Otto H. Schmitt, Port Washington, N. Y., assignor to the United States of America as represented by the Secretary of the Navy Application August 7, 1944, Serial No. 548,485

5 Claims. (Cl. 324—43)

This invention relates to magnetometers and more particularly to magnetometers utilizing saturated-core magnetometer elements connected in a bridge circuit and operated as a balanced magnetometer.

Such balanced magnetometers, when provided with suitable auxiliary circuits, are used for measuring the intensity of a magnetic field and are particularly useful for measuring small changes or anomalies in a magnetic field. When the magnetometer elements are properly connected in a bridge as a balanced magnetometer and are driven cyclically into and out of saturation by a suitable oscillator, the bridge output is ideally a series of unipolar pulses having a pulse frequency equal to twice the frequency at which the bridge is driven and varying in amplitude and polarity with applied magnetic field. Several magnetometer systems incorporating balanced magnetometer elements of this type have been devised, these systems including circuits for measuring the amplitude of the resultant pulses at the output of the magnetometer element bridge and producing an output voltage varying in amplitude and polarity with the applied magnetic field.

Magnetometer systems of this general type require precise balancing of the saturated-core magnetometer elements and of the other components of the magnetometer element bridge. If such balancing is not carried out with the required degree of precision, the sensitive pulses produced by applied magnetic fields may be accompanied by unwanted insensitive signal components or "hash" components which are essentially independent of applied magnetic field, this effect resulting in a substantial reduction in the overall usefulness of the system.

It is an object of the present invention to provide a magnetometer utilizing the balanced element bridge described above which does not require exact balancing of the various components of the system but which, nevertheless, produces an accurate indication of field variations.

Accordingly, means are provided in combination with a pair of saturated-core magnetometer elements connected in a bridge circuit and operated as a balanced magnetometer for producing an output proportional only to variations in an applied magnetic field, this output being independent of "hash" components contained in the output of the magnetometer elements.

Figure 1:
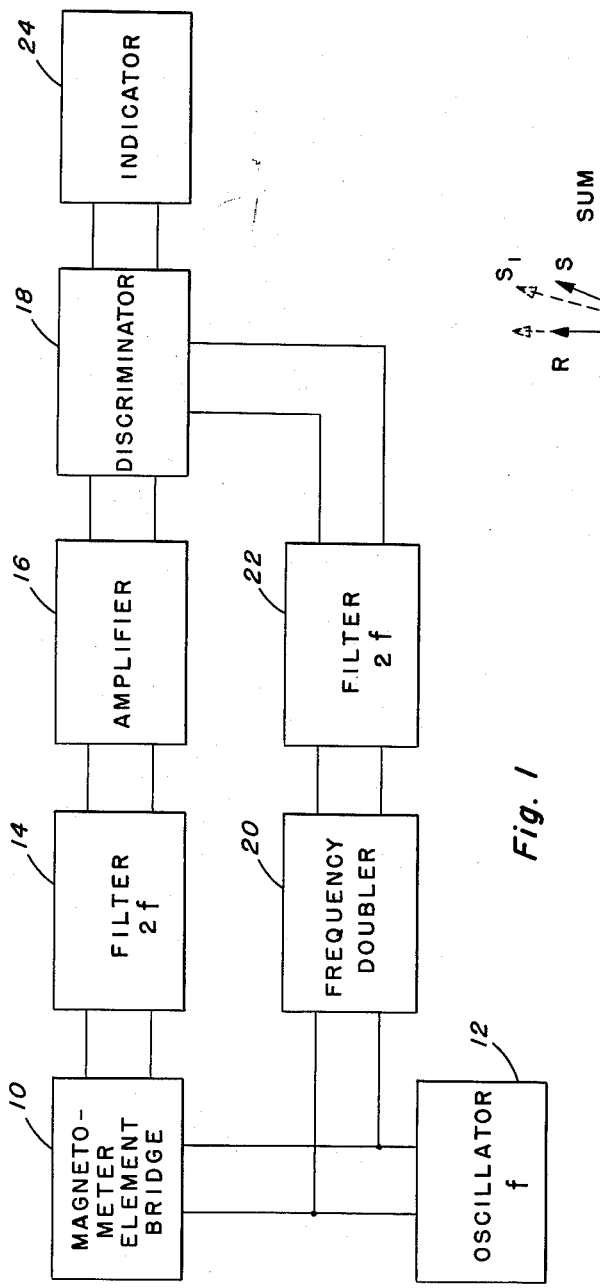
Figure 2:
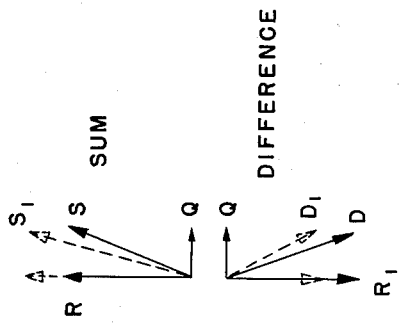
Figure 3:
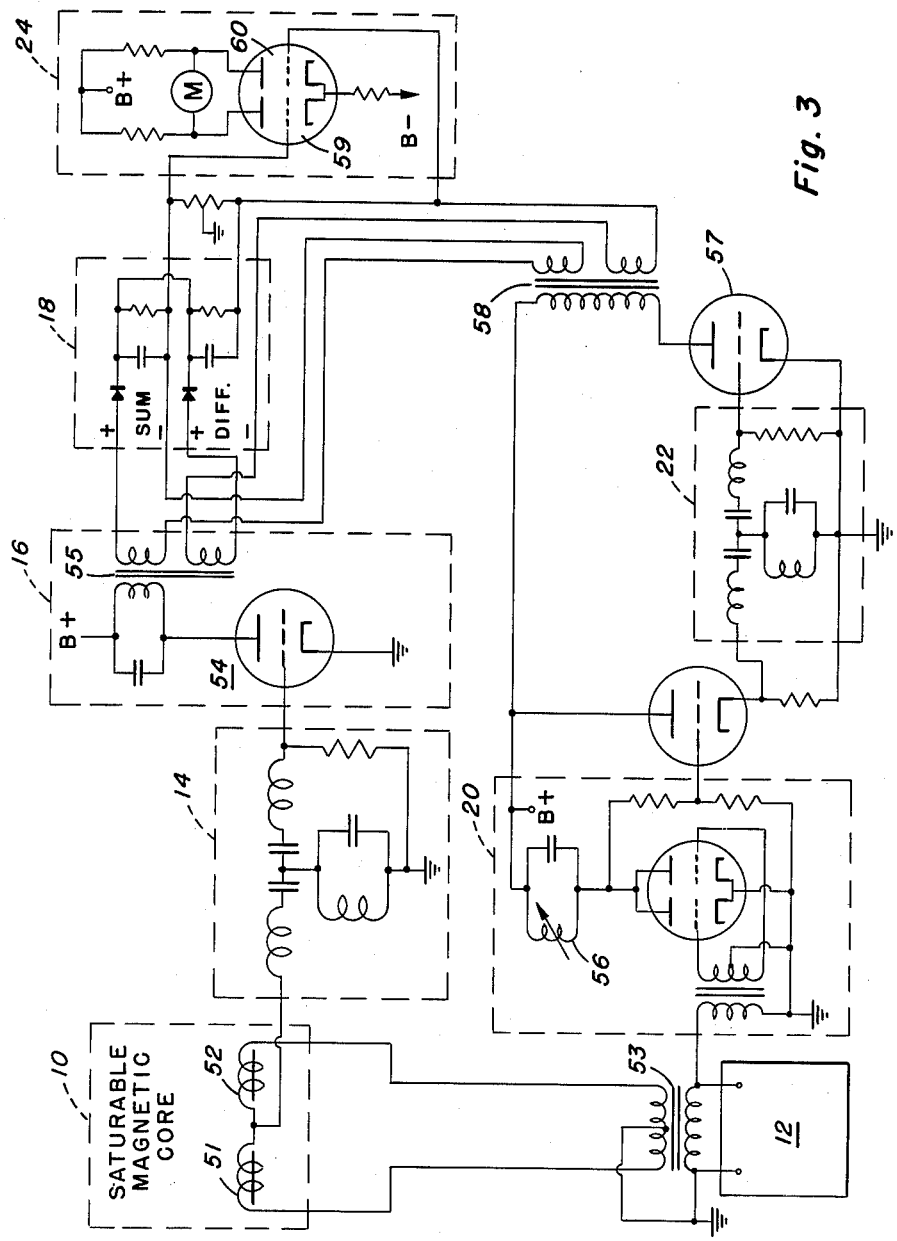

For a better understanding of the invention, reference is made to the accompanying drawing in which Fig. 1 is a block diagram of the improved magnetometer of the invention;

Fig. 2 is a vector diagram showing the relationships of various components of the signal at one point in the magnetometer system of Fig. 1; and Fig. 3 is a schematic representation of one embodiment of the circuits represented by the block diagram of Fig. 1.

As shown in Fig. 1, the magnetometer system includes a magnetometer element bridge 10. This bridge comprises a pair of saturated-core magnetometer elements connected in opposite arms of a conventional bridge circuit and arranged to operate as a balanced magnetometer. Magnetometer bridge 10 is driven sinusoidally by an oscillator 12 at fundamental frequency, this oscillator excitation operating to drive the balanced magnetometer elements cyclically into and out of saturation.

Under these conditions the output of the bridge is a series of unipolar pulses, the magnitude and polarity of which vary with applied magnetic field. Ideally, there is no output from the magnetometer bridge in the absence of applied field. However, in almost all cases, the degree of balance between the magnetometer elements or other components in the bridge that can be obtained with reasonable care is insufficient to allow realization of this condition. Consequently, in most practicable arrangements, the bridge output contains components which are substantially independent of applied magnetic field and of such nature as to mask outputs due to low values of applied fields.

In order to avoid the undesirable effects of such components, means are provided in accordance with the invention whereby an output proportional only to changes in the applied magnetic field may be obtained. Accordingly, the output of magnetometer bridge 10 is applied to a filter 14 tuned to twice the drive frequency, and providing substantially sinusoidal output. When there is no magnetic field acting at the magnetometer elements, the output of filter 14 contains only second-harmonic components due to the "hash," these components being of random phase. The application of a magnetic field at the magnetometer bridge results in the addition to the filter output of a second-harmonic component proportional to the sensitive output of the magnetometer bridge. The amplitude of the last-mentioned component varies with pulse height and its phase reverses as the pulses change polarity.

The above-mentioned filter output components due to "hash" may be either algebraically in phase or in quadrature with the filter output component due to the sensitive output of the magnetometer bridge. The resultant of the algebraically in-phase components adds algebraically to the sensitive component and may be eliminated by simple centering adjustments in the measuring circuits. The quadrature component, however, adds vectorially to the sensitive component, producing a resultant which cannot be eliminated by simple means, and which distorts the output of any ordinary amplitude-sensitive measuring device. Means are provided, therefore, for eliminating the effect of such quadrature components on the sensitive filter output signals.

The output of filter 14 is applied to the input of amplifier 16 which may be of any suitable type so long as it does not introduce unwanted phase shifts or distortions in amplitude in the applied signal. The output of amplifier 16 is applied to a discriminator 18.

Means are provided for applying to the discriminator a reference signal of second-harmonic frequency and having an amplitude which is relatively large in relation to that of the quadrature component in the output of amplifier 16. Conveniently, this reference signal is obtained from drive oscillator 12 using a frequency doubler 20 of conventional type, and a filter 22 tuned to the second harmonic of the drive frequency, the reference signal being in phase with the sensitive output of filter 14 as it appears at the output of amplifier 16. It will be understood, however, that other means may be used for providing the reference signal, the only requirements being that it be constant in phase, of second-harmonic frequency, and of considerable amplitude in relation to the quadrature output of amplifier 16.

Discriminator 18 provides means whereby the output of amplifier 16 and the reference signal are combined and used to obtain outputs proportional to the sum and the difference of the two signals. Conveniently the discriminator circuits are so arranged that the signal at the output of amplifier 16 is added to and subtracted from the reference signal, although the signals may equally well be combined in the reverse order.

Referring to Fig. 2 of the drawing, there is shown vectorially the relationships of the various components in the outputs of the sum and difference circuits of discriminator 18. In each of these outputs the quadrature component is represented by the vector Q, while the reference signal in the sum circuit is represented by the vector R, and that in the difference circuit is represented by the vector $R_1$. The vector Q is substantially constant, while vectors R and $R_1$ are constantly equal and opposite and in quadrature with the vector Q. In the absence of signal, then, the output of the sum circuit is the vector S, while that of the difference circuit is the vector D, of equal magnitude. When the output of amplifier 16 includes a component proportional to applied field, it is added to, or subtracted from, the reference signal in the appropriate discriminator circuit. Assuming that a signal proportional to a positive applied field adds to the reference signal in the sum circuit, the output of this circuit is represented by vector $S_1$, while that of the difference circuit is represented by vector $D_1$.

Means are also provided in discriminator 18 whereby the outputs of the sum and difference circuits are rectified and subtracted. Recalling that the reference signal represented by vectors R and $R_1$ is large in relation to the quadrature component represented by vector Q, it will be seen that the angles between the reference signal vectors and the vectors representing the outputs of the sum and difference circuits are very small. It is possible, therefore, to assume that the component of the output vector in the direction of the reference vector is an accurate measure of the applied magnetic field. Thus, in the absence of applied magnetic field, vectors S and D produce equal and opposite rectified outputs in the discriminator and their difference is zero. In the presence of field, as for example one resulting in positive pulses at the magnetometer bridge output, the rectified output due to vector $S_1$ is greater than that due to vector $D_1$ and of opposite polarity, and a resultant output voltage having amplitude and polarity varying with the magnetic field acting at the magnetometer elements is produced. An indicator 24, for example a recording milliammeter, is connected to the output of discriminator 18, this meter then giving indications proportional only to changes in applied magnetic field, the effect of quadrature components having been eliminated in the summing and differencing process.

As hereinbefore stated, Fig. 3 presents schematically an illustrative embodiment of the apparatus of Fig. 1 wherein saturable-core magnetometer elements 51 and 52 are disposed across one winding of transformer 53 in arrangement to operate as a balanced magnetometer forming bridge 10. Oscillator excitation from conventional oscillator 12 which may be a Wein bridge oscillator with a self-contained power amplifier (not shown) is applied across transformer 53 to drive balanced magnetometer elements 51 and 52 cyclically into and out of saturation to provide unipolar pulse output of a magnitude and polarity in accordance with the applied magnetic field. However, possible degree of balance between the bridge components is not ideal so troublesome components exist in the bridge output which are substantially independent of applied magnetic field. Output of the bridge 10 is applied from a point between elements 51 and 52 to filter 14 which filter is tuned to twice the drive frequency and provides sinusoidal output. In the absence of magnetic field operating at the magnetometer elements 51 and 52, the output of filter 14 contains second-harmonic components of "hash." Output of filter 14 may be applied at the grid input of triode 54, a conventional amplifier, and the output of amplifier 54 applied to the sum and difference sections (not numbered) of discriminator 18 from the two secondaries of transformer 55. A reference signal of large amplitude in comparison with the quadrature component in the output of amplifier 16, is obtained from drive oscillator 12, fed to frequency doubler 20 through filter 22, tuned to the second harmonic of the drive frequency, the reference signal being in phase with the sensitive output of amplifier 16. The frequency doubler may be adjustable by adjustable means 56 to permit precision phase adjustment. Through stage 57, the reference signal is fed by means of transformer coupling through transformer 58 to combine the output of amplifier 16 and the reference signal by addition and subtraction in discriminator 18 to obtain output proportional to the sum and difference of these two signals. The recording milliammeter in the output of discriminator 18 is disposed between the anodes of stages 59 and 60 of indicator 24 and gives indications proportional only to changes in applied magnetic field.

The circuits shown utilize conventional tubes shown as triodes for convenience. Filters 14 and 22 may be packaged quiescent LC units here shown in single full section arrangement.

What is claimed is:

1. A magnetometer system comprising a balanced magnetometer; means for driving said magnetometer cyclically; a filter for isolating sensitive components in the output of the magnetometer of double the drive frequency; means for generating a reference signal of double the drive frequency and in phase with the sensitive output of the filter; discriminator means connected to receive said sensitive output and said reference signal for producing signals proportional to the sum and difference of the output of the filter and the reference signal, and including means for producing an output signal proportional to the difference between the sum and difference signals.

2. For use with a balanced magnetometer including a driving means connected thereto, means for obtaining an output proportional only to changes in an applied magnetic field, comprising a filter tuned to a frequency equal to twice the magnetometer driving frequency coupled to the output of the magnetometer and passing a sensitive signal of double the driving frequency; means, including a frequency doubler and a filter tuned to the second harmonic of the drive frequency, connected to the driving means and providing a reference signal of second harmonic frequency and in phase with the sensitive signal; discriminator means receiving said sensitive and reference signals for producing outputs proportional to the sum and the difference of the two signals, and including means for subtracting said outputs; and an indicator coupled to said discriminator for providing visual indications of variations in the applied magnetic field.

3. A constant phase magnetometer system comprising a balanced magnetometer; a driving means connected thereto; a filter tuned to a frequency equal to twice the magnetometer driving frequency coupled to the output of the magnetometer and passing a sensitive signal of double the driving frequency; means, including a frequency doubler and a filter tuned to the second harmonic of the drive frequency, connected to the driving means providing a reference signal of second harmonic frequency and in phase with the sensitive signal; discriminator means receiving said sensitive and reference signals for producing intermediate outputs proportional to the sum and the difference of the two signals, and including means for producing an output signal proportional to the difference between the intermediate outputs; and an indicator coupled to said discriminator and receiving said output signal for providing a visual indication of variations in the applied magnetic field.

4. For use with a balanced magnetometer including a driving means connected thereto, means for obtaining an output signal proportional only to changes in an applied magnetic field, comprising a filter tuned to a frequency equal to twice the magnetometer driving frequency coupled to the output of the magnetometer and passing a sensitive signal of double the driving frequency; an amplifier coupled to said filter amplifying the sensitive signal; means, including a filter tuned to the second harmonic of the drive frequency, connected to the driving means providing a reference signal of second harmonic frequency and in phase with the sensitive signal; and a discriminator coupled to said amplifier and to said second harmonic filter, including means for producing outputs proportional to the sum and the difference of the sensitive and reference signals and further means for producing an output signal proportional to the difference between said outputs.

5. A constant phase magnetometer system comprising a balanced magnetometer; a driving means coupled thereto; a filter tuned to a frequency equal to twice the magnetometer driving frequency coupled to the magnetometer and passing a sensitive signal of double the driving frequency; an amplifier coupled to the filter amplifying said sensitive signal; means, including a filter tuned to the second harmonic of the driving frequency, connected to the driving means providing a reference signal of second harmonic frequency and in phase with said sensitive signal; a discriminator coupled to said amplifier and to said second harmonic filter, including means for producing outputs proportional to the sum and the difference of the sensitive and reference signals and further means for producing an output signal proportional to the difference between said outputs; and an indicator coupled to said discriminator for providing a visual indication of variations in the applied magnetic field.

References Cited in the file of this patent

UNITED STATES PATENTS

| | | |
|---|---|---|
| 2,053,154 | La Pierre | Sept. 1, 1936 |
| 2,094,207 | Eaton | Sept. 28, 1937 |
| 2,242,661 | Rust | May 20, 1941 |
| 2,290,330 | Irwin | July 21, 1942 |
| 2,476,273 | Beach | July 19, 1949 |